US012802271B2

(12) United States Patent
Kimura

(10) Patent No.: US 12,802,271 B2
(45) Date of Patent: Nov. 17, 2026

(54) TRANSFERRING THE COORDINATE SYSTEM OF A THREE-DIMENSIONAL CAMERA TO THE INCIDENT POINT OF A TWO-DIMENSIONAL CAMERA

(71) Applicant: Magik Eye Inc., Stamford, CT (US)

(72) Inventor: Akiteru Kimura, Hachioji (JP)

(73) Assignee: Magik Eye Inc., Stamford, CT (US)

( * ) Notice: Subject to any disclaimer, the term of this patent is extended or adjusted under 35 U.S.C. 154(b) by 559 days.

(21) Appl. No.: 18/317,346

(22) Filed: May 15, 2023

(65) Prior Publication Data

US 2023/0281849 A1 Sep. 7, 2023

Related U.S. Application Data

(63) Continuation of application No. 17/140,967, filed on Jan. 4, 2021.

(Continued)

(51) Int. Cl.

*G06T 7/80* (2017.01)
*G01C 3/02* (2006.01)
*H04B 10/40* (2013.01)

(52) U.S. Cl.

CPC .................. *G06T 7/80* (2017.01); *G01C 3/02* (2013.01); *H04B 10/40* (2013.01)

(58) Field of Classification Search

CPC .............. G06T 7/80; G01C 3/02; H04B 10/40
See application file for complete search history.

(56) References Cited

U.S. PATENT DOCUMENTS 4,268,146 A * 5/1981 Johnson ................. G03B 15/03 396/178
4,914,460 A 4/1990 Caimi et al.

(Continued)

FOREIGN PATENT DOCUMENTS

CN 101794065 A 8/2010
CN 103196385 A 7/2013

(Continued)

OTHER PUBLICATIONS

Huang et al., “LIDAR, Camera and Inertial Sensors Based Navigation Techniques for Advanced Intelligent Transportation Systems”, UC Riverside Electronic Theses and Dissertations at https://escholarship.org/us/item1p02x8xq, Dec. 2010.

*Primary Examiner* — Casey L Kretzer
(74) *Attorney, Agent, or Firm* — Adams Intellex, PLC

(57) ABSTRACT

An example method includes acquiring a three-dimensional coordinate system associated with a three-dimensional camera and a first reference point associated with the three-dimensional camera, acquiring a two-dimensional coordinate system associated with a two-dimensional camera and a second reference point associated with the two-dimensional camera, aligning the three-dimensional coordinate system with the two-dimensional coordinate system, based on a fixed and known positional relationship between the first reference point and the second reference point, to obtain a fixed positional relationship between the three-dimensional coordinate system and the two-dimensional coordinate system, and transferring the three-dimensional coordinate system to a datum point of the two-dimensional coordinate system, using the fixed positional relationship between the three-dimensional coordinate system and the two-dimensional coordinate system.

18 Claims, 9 Drawing Sheets

Related U.S. Application Data

(60) Provisional application No. 62/957,251, filed on Jan. 5, 2020.

(56) References Cited

U.S. PATENT DOCUMENTS

| | | | | |
|---|---|---|---|---|
| 5,699,444 | A | 12/1997 | Palm | |
| 5,730,702 | A | 3/1998 | Tanaka et al. | |
| 5,870,136 | A | 2/1999 | Fuchs et al. | |
| 5,980,454 | A | 11/1999 | Broome | |
| 6,038,415 | A | 3/2000 | Nishi et al. | |
| 6,442,476 | B1 | 8/2002 | Poropat | |
| 6,478,474 | B1 * | 11/2002 | Sander | G02B 6/3839 385/136 |
| 6,668,082 | B1 | 12/2003 | Davison et al. | |
| 6,937,350 | B2 | 8/2005 | Shirley | |
| 7,191,056 | B2 | 3/2007 | Costello et al. | |
| 7,193,645 | B1 | 3/2007 | Aagaard et al. | |
| 7,375,803 | B1 | 5/2008 | Bamji | |
| 7,589,825 | B2 | 9/2009 | Orchard et al. | |
| 9,098,909 | B2 | 8/2015 | Nomura | |
| 9,488,757 | B2 | 11/2016 | Mukawa | |
| 9,536,339 | B1 | 1/2017 | Worley et al. | |
| 9,686,539 | B1 | 6/2017 | Zuliani et al. | |
| 9,888,225 | B2 | 2/2018 | Znamensky et al. | |
| 9,986,208 | B2 | 5/2018 | Chao et al. | |
| 2003/0071891 | A1 | 4/2003 | Geng | |
| 2004/0167744 | A1 | 8/2004 | Lin et al. | |
| 2006/0044546 | A1 | 3/2006 | Lewin et al. | |
| 2006/0055942 | A1 | 3/2006 | Krattiger | |
| 2006/0290781 | A1 | 12/2006 | Hama | |
| 2007/0091174 | A1 | 4/2007 | Kochi et al. | |
| 2007/0165243 | A1 | 7/2007 | Kang et al. | |
| 2007/0206099 | A1 | 9/2007 | Matsuo | |
| 2007/0275596 | A1 * | 11/2007 | Ryu | H01R 13/2442 439/567 |
| 2010/0007719 | A1 | 1/2010 | Frey et al. | |
| 2010/0149315 | A1 | 6/2010 | Qu et al. | |
| 2010/0223706 | A1 | 9/2010 | Becker et al. | |
| 2010/0238416 | A1 | 9/2010 | Kuwata | |
| 2011/0037849 | A1 | 2/2011 | Niclass et al. | |
| 2011/0188054 | A1 | 8/2011 | Petronius et al. | |
| 2012/0051588 | A1 | 3/2012 | Mceldowney | |
| 2012/0056982 | A1 | 3/2012 | Katz et al. | |
| 2012/0062758 | A1 | 3/2012 | Devine et al. | |
| 2012/0113252 | A1 | 5/2012 | Yang et al. | |
| 2012/0219699 | A1 | 8/2012 | Pettersson | |
| 2012/0225718 | A1 | 9/2012 | Zhang | |
| 2012/0236288 | A1 | 9/2012 | Stanley | |
| 2012/0236317 | A1 | 9/2012 | Nomura | |
| 2013/0076865 | A1 | 3/2013 | Tateno et al. | |
| 2013/0088575 | A1 | 4/2013 | Park et al. | |
| 2013/0155417 | A1 | 6/2013 | Ohsawa | |
| 2013/0242090 | A1 | 9/2013 | Yoshikawa | |
| 2013/0307933 | A1 | 11/2013 | Znamensky et al. | |
| 2013/0314688 | A1 | 11/2013 | Likholyot | |
| 2014/0000520 | A1 | 1/2014 | Bareket | |
| 2014/0009571 | A1 | 1/2014 | Geng | |
| 2014/0016113 | A1 | 1/2014 | Holt et al. | |
| 2014/0036096 | A1 | 2/2014 | Sterngren | |
| 2014/0071239 | A1 | 3/2014 | Yokota | |
| 2014/0085429 | A1 | 3/2014 | Hérbert | |
| 2014/0125813 | A1 | 5/2014 | Holz | |
| 2014/0207326 | A1 | 7/2014 | Murphy | |
| 2014/0241614 | A1 | 8/2014 | Lee | |
| 2014/0275986 | A1 | 9/2014 | Vertikov | |
| 2014/0320605 | A1 | 10/2014 | Johnson | |
| 2015/0009301 | A1 | 1/2015 | Ribnick et al. | |
| 2015/0012244 | A1 | 1/2015 | Oki | |
| 2015/0016003 | A1 | 1/2015 | Terry et al. | |
| 2015/0062558 | A1 | 3/2015 | Koppal et al. | |
| 2015/0077764 | A1 | 3/2015 | Braker et al. | |
| 2015/0131054 | A1 | 5/2015 | Wuellner et al. | |
| 2015/0171236 | A1 | 6/2015 | Murray | |
| 2015/0248796 | A1 | 9/2015 | Iyer et al. | |
| 2015/0268399 | A1 | 9/2015 | Futterer | |
| 2015/0288956 | A1 | 10/2015 | Mallet et al. | |
| 2015/0323321 | A1 | 11/2015 | Oumi | |
| 2015/0336013 | A1 | 11/2015 | Stenzier et al. | |
| 2015/0381907 | A1 | 12/2015 | Boetliger et al. | |
| 2016/0022374 | A1 | 1/2016 | Haider | |
| 2016/0041266 | A1 | 2/2016 | Smits | |
| 2016/0117561 | A1 | 4/2016 | Miyazawa et al. | |
| 2016/0128553 | A1 | 5/2016 | Geng | |
| 2016/0157725 | A1 | 6/2016 | Munoz | |
| 2016/0178915 | A1 | 6/2016 | Mor et al. | |
| 2016/0249810 | A1 | 9/2016 | Darty et al. | |
| 2016/0261854 | A1 | 9/2016 | Ryu et al. | |
| 2016/0267682 | A1 | 9/2016 | Yamashita | |
| 2016/0288330 | A1 | 10/2016 | Konolige | |
| 2016/0327385 | A1 | 11/2016 | Kimura | |
| 2016/0328854 | A1 | 11/2016 | Kimura | |
| 2016/0334939 | A1 | 11/2016 | Dawson et al. | |
| 2016/0350594 | A1 | 12/2016 | McDonald | |
| 2016/0379368 | A1 | 12/2016 | Sakas et al. | |
| 2017/0098305 | A1 | 4/2017 | Gossow | |
| 2017/0102461 | A1 | 4/2017 | Tezuka et al. | |
| 2017/0221226 | A1 | 8/2017 | Shen et al. | |
| 2017/0270689 | A1 | 9/2017 | Messely et al. | |
| 2017/0284799 | A1 | 10/2017 | Wexler et al. | |
| 2017/0307544 | A1 | 10/2017 | Nagata | |
| 2017/0347086 | A1 | 11/2017 | Watanabe | |
| 2018/0010903 | A1 | 1/2018 | Takao et al. | |
| 2018/0011194 | A1 | 1/2018 | Masuda et al. | |
| 2018/0073863 | A1 | 3/2018 | Watanabe | |
| 2018/0080761 | A1 | 3/2018 | Takao et al. | |
| 2018/0143018 | A1 | 5/2018 | Kimura | |
| 2018/0156609 | A1 | 6/2018 | Kimura | |
| 2018/0227566 | A1 | 8/2018 | Price et al. | |
| 2018/0249142 | A1 | 8/2018 | Hicks et al. | |
| 2018/0324405 | A1 | 11/2018 | Thirion | |
| 2018/0329038 | A1 | 11/2018 | Lin et al. | |
| 2018/0357871 | A1 | 12/2018 | Siminoff | |
| 2019/0064359 | A1 | 2/2019 | Yang | |
| 2019/0107387 | A1 | 4/2019 | Kimura | |
| 2019/0108743 | A1 | 4/2019 | Kimura | |
| 2019/0122057 | A1 | 4/2019 | Kimura | |
| 2019/0278099 | A1 * | 9/2019 | Zhou | H04N 13/296 |
| 2019/0295270 | A1 | 9/2019 | Kimura | |
| 2019/0297241 | A1 | 9/2019 | Kimura | |
| 2019/0377088 | A1 | 12/2019 | Kimura | |
| 2020/0003556 | A1 | 1/2020 | Kimura | |
| 2020/0051268 | A1 | 2/2020 | Kimura | |
| 2020/0182974 | A1 | 6/2020 | Kimura | |
| 2020/0236315 | A1 | 7/2020 | Kimura | |
| 2020/0285831 | A1 * | 9/2020 | Slatcher | G01C 21/383 |

FOREIGN PATENT DOCUMENTS

| | | | |
|---|---|---|---|
| CN | 103559735 | A | 2/2014 |
| CN | 104160243 | A | 11/2014 |
| CN | 104515514 | A | 4/2015 |
| EP | 0358628 | A2 | 3/1990 |
| JP | H4-51112 | A | 2/1992 |
| JP | H9-61126 | | 3/1997 |
| JP | 4485365 | B2 | 2/2006 |
| JP | 2006-313116 | A | 11/2006 |
| JP | 2007-10346 | A | 1/2007 |
| JP | 2007-187581 | A | 7/2007 |
| JP | 2007-315864 | A | 12/2007 |
| JP | 2010-091855 | A | 4/2010 |
| JP | 2010-101683 | A | 5/2010 |
| JP | 2010-256182 | A | 11/2010 |
| JP | 2012-047500 | A | 3/2012 |
| JP | 2014-020978 | A | 2/2014 |
| JP | 2014-511590 | A | 5/2014 |
| JP | 2014-122789 | A | 7/2014 |
| JP | 6038415 | B1 | 12/2016 |
| JP | 6241793 | B2 | 12/2017 |
| KR | 10-2013-0000356 | A | 1/2013 |
| KR | 10-2013-0037152 | A | 4/2013 |
| KR | 10-2015-0101749 | A | 9/2015 |
| KR | 10-2016-0020323 | | 2/2016 |
| KR | 10-2017-0005649 | A | 1/2017 |

(56) References Cited

FOREIGN PATENT DOCUMENTS

| | | | |
|---|---|---|---|
| KR | 10-2017-0054221 | A | 5/2017 |
| KR | 10-2017-0094968 | | 8/2017 |
| TW | I320480 | B | 2/2010 |
| TW | I451129 | B | 4/2012 |
| WO | WO 2012/081506 | A1 | 6/2012 |
| WO | WO 2013/0145164 | | 10/2013 |
| WO | WO 2014/0106843 | A2 | 7/2014 |
| WO | WO 2014/131064 | | 8/2014 |
| WO | WO 2015/166915 | A1 | 11/2015 |

* cited by examiner

600

700

800

TRANSFERRING THE COORDINATE SYSTEM OF A THREE-DIMENSIONAL CAMERA TO THE INCIDENT POINT OF A TWO-DIMENSIONAL CAMERA

CROSS REFERENCE TO RELATED APPLICATIONS

This application is a continuation of U.S. patent application Ser. No. 17/140,967, filed Jan. 4, 2021, which in turn claims the priority of U.S. Provisional Patent Application Ser. No. 62/957,251, filed Jan. 5, 2020. Both of these applications are herein incorporated by reference in their entireties.

FIELD OF THE INVENTION

The invention related generally to distance measurement, and relates more particularly to transferring the coordinate system of a three-dimensional camera to the incident point of a two-dimensional camera.

BACKGROUND

Two-dimensional images captured by two-dimensional (e.g., red, green, blue or RGB) cameras are often used for applications including object recognition, measurement, autonomous navigation, robotics, and motion capture, among others. In many of these applications, it is useful to link three-dimensional image information to objects or points in these two-dimensional images.

SUMMARY

In one example, a method performed by a processing system including at least one processor includes acquiring a three-dimensional coordinate system associated with a three-dimensional camera and a first reference point associated with the three-dimensional camera, acquiring a two-dimensional coordinate system associated with a two-dimensional camera and a second reference point associated with the two-dimensional camera, aligning the three-dimensional coordinate system with the two-dimensional coordinate system, based on a fixed and known positional relationship between the first reference point and the second reference point, to obtain a fixed positional relationship between the three-dimensional coordinate system and the two-dimensional coordinate system, and transferring the three-dimensional coordinate system to a datum point of the two-dimensional coordinate system, using the fixed positional relationship between the three-dimensional coordinate system and the two-dimensional coordinate system.

In another example, a non-transitory machine-readable storage medium is encoded with instructions executable by a processing system including at least one processor. When executed, the instructions cause the processing system to perform operations including acquiring a three-dimensional coordinate system associated with a three-dimensional camera and a first reference point associated with the three-dimensional camera, acquiring a two-dimensional coordinate system associated with a two-dimensional camera and a second reference point associated with the two-dimensional camera, aligning the three-dimensional coordinate system with the two-dimensional coordinate system, based on a fixed and known positional relationship between the first reference point and the second reference point, to obtain a fixed positional relationship between the three-dimensional coordinate system and the two-dimensional coordinate system, and transferring the three-dimensional coordinate system to a datum point of the two-dimensional coordinate system, using the fixed positional relationship between the three-dimensional coordinate system and the two-dimensional coordinate system.

In another example, an apparatus includes a processing system including at least one processor and a non-transitory machine-readable storage medium encoded with instructions executable by the processing system. When executed, the instructions cause the processing system to perform operations including acquiring a three-dimensional coordinate system associated with a three-dimensional camera and a first reference point associated with the three-dimensional camera, acquiring a two-dimensional coordinate system associated with a two-dimensional camera and a second reference point associated with the two-dimensional camera, aligning the three-dimensional coordinate system with the two-dimensional coordinate system, based on a fixed and known positional relationship between the first reference point and the second reference point, to obtain a fixed positional relationship between the three-dimensional coordinate system and the two-dimensional coordinate system, and transferring the three-dimensional coordinate system to a datum point of the two-dimensional coordinate system, using the fixed positional relationship between the three-dimensional coordinate system and the two-dimensional coordinate system.

DETAILED DESCRIPTION

Figure 1:
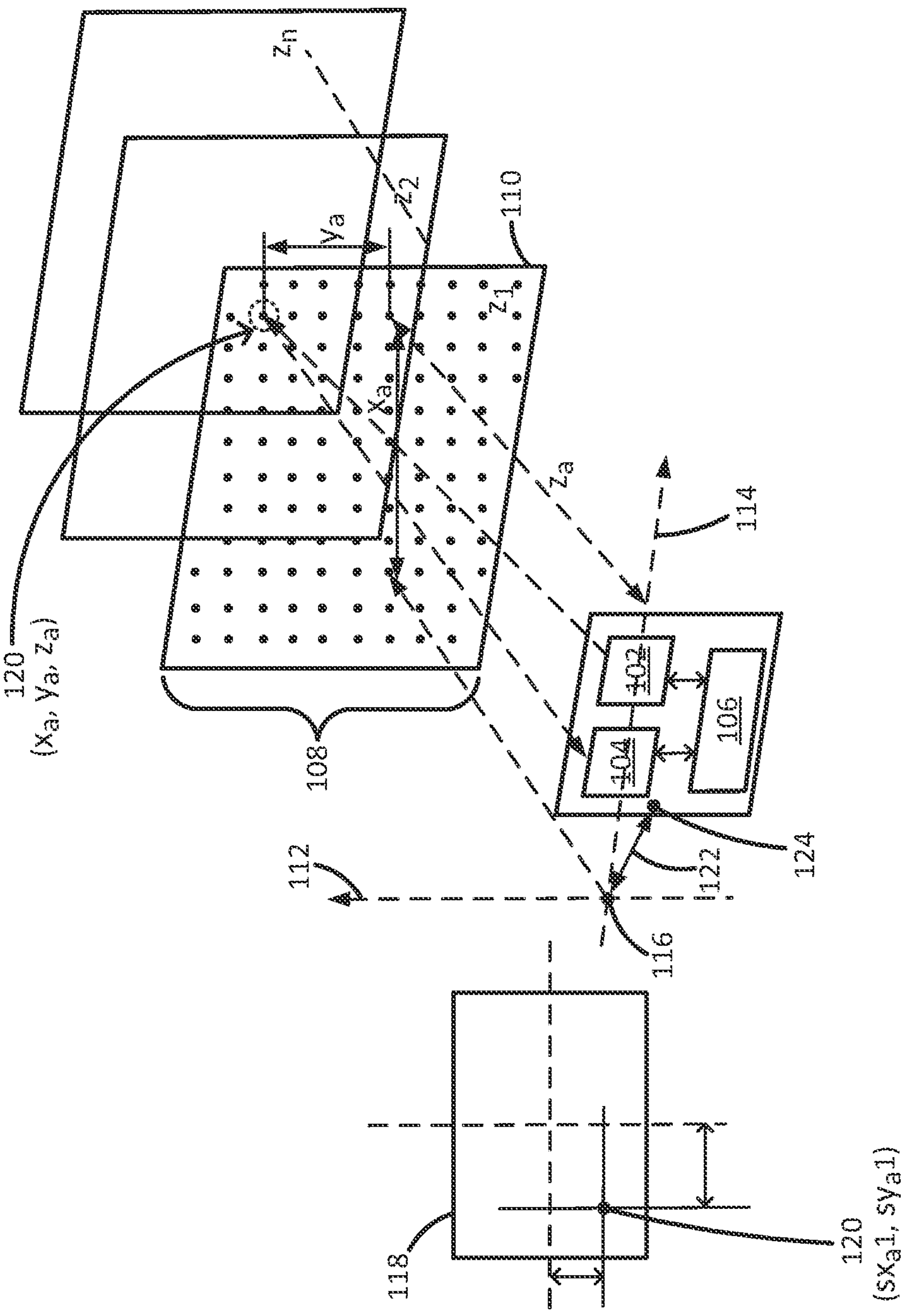
FIG. 1 is a schematic diagram illustrating the relationship between the different coordinate systems of an example distance sensor that includes a two-dimensional imaging sensor and a three-dimensional imaging sensor, according to the present disclosure.

The present disclosure broadly describes an apparatus, method, and non-transitory computer-readable medium for transferring the coordinate system of a three-dimensional camera to the incident point of a two-dimensional camera. As discussed above, two-dimensional images captured by two-dimensional (e.g., red, green, blue or RGB) cameras are often used for applications including object recognition, measurement, autonomous navigation, robotics, and motion capture, among others. In many of these applications, it is useful to link three-dimensional image information to objects or points in these two-dimensional images.

Most three-dimensional sensor systems operate on the premise that the systems are composed of multiple sensors and cameras and are accordingly configured to set a position of a three-dimensional coordinate system using the data (e.g., two-dimensional images, three-dimensional maps, etc.) obtained under these conditions. These sensor systems do not typically consider the mechanical positional relationship of the coordinate systems of each sensor or the combination of these coordinate systems. Furthermore, no known system exists that focuses on mechanical positioning from this viewpoint. However, the concept of mechanical positioning is very important when applied to a real scene, such as a three-dimensional measurement device that must obtain correct measurement results.

Examples of the present disclosure provide a means for transferring the coordinate system of a three-dimensional camera to the incident point of a two-dimensional camera. In one example, a first reference point is defined having a fixed, known position relative to a datum point (origin) of a three-dimensional coordinate system associated with the three-dimensional camera. Additionally, a second reference point is defined having a fixed, known position relative to a datum point (origin) of a two-dimensional coordinate system associated with the two-dimensional camera. A fixed positional relationship between the first reference point and the second reference point is also known. Thus, knowing these three positional relationships allows the three-dimensional coordinate system to be transferred to the front nodal point of the two-dimensional camera. By calculating the translational and rotation movements required to effect the transfer, a point in the three-dimensional coordinate system can be assigned a position on an imaging sensor of the two-dimensional camera and a depth.

Examples of the present disclosure demonstrate that a reference (such as a reference point in a two-dimensional coordinate system of a two-dimensional camera) may be matched at the time of calibration with a reference (or datum) point of a three-dimensional coordinate system of a three-dimensional camera. This ability can be used to guide positioning of a two-dimensional camera. Thus, the positional relationship of the two-dimensional camera's optical system (e.g., optical axis, principal point position, and the like which are determined by the lens, imaging sensor, and other camera components) may be determined in a controlled state with respect to a positioning system or mounting mechanism of a three-dimensional camera. This allows two-dimensional data to be correctly linked with three-dimensional data.

Further examples of the present disclosure provide housing structures for a three-dimensional camera and a two-dimensional camera that allow the three-dimensional camera and the two-dimensional camera to be connected to form a single device. Correspondence between the separate coordinate systems of the three-dimensional camera and the two-dimensional camera can be correctly achieved simply by connecting the cameras in the single device using the positioning systems on the housings. This arrangement also makes it possible to set or measure a coordinate reference for the housings in advance for each three-dimensional camera and two-dimensional camera, even if the specifications of the cameras are different. Within the context of the present disclosure, a "two-dimensional image" is understood to refer to an image acquired using light in a spectrum that is visible to the human eye (e.g., by a conventional red, green, blue (RGB) image sensor). By contrast, an image of a three-dimensional pattern is acquired using light in a spectrum that is invisible to the human eye (e.g., by an infrared imaging sensor).

The present disclosure contemplates different configurations of distance sensors that include both two-dimensional and three-dimensional imaging sensors. For instance, one type of distance sensor may comprise two separate light receiving systems/cameras, where a first light receiving system includes the imaging three-dimensional sensor and a second light receiving system includes the two-dimensional camera. In this case, the mechanical positional relationship between the housing of the second light receiving system and the two-dimensional coordinate system is fixed at a first value. The mechanical positional relationship between the external mounting mechanism that positions and fixes the housing of the second light receiving system to the distance sensor and the two-dimensional coordinate system associated with the two-dimensional imaging sensor is fixed at a second value. The first value and the second value may be stored in a memory that is accessible to a processor of the distance sensor (e.g., a local memory of the distance sensor, an external database, or the like).

The first light receiving system includes a designated reference point whose position relative to the three-dimensional coordinate system is known and fixed at a third value. A position of the reference point relative to an external mounting mechanism used to fix the housing of the first light receiving system to the distance sensor is fixed at a fourth value. Like the first value and the second value, the third value and the fourth value may be stored in a memory that is accessible to a processor of the distance sensor. The processor may also be capable of transferring the three-dimensional coordinate system to an arbitrary position.

Another type of distance sensor may comprise a single, integrated light receiving system that includes both a two-dimensional imaging sensor and a three-dimensional imaging sensor. In this case, the distance sensor may include an external mounting mechanism, where the positions of the external mounting mechanism relative to both the three-dimensional coordinate system associates with the three-dimensional imaging sensor and the two-dimensional coordinate system associated with the two-dimensional imaging sensor are determined and managed.

FIG. 1 is a schematic diagram illustrating the relationship between the different coordinate systems of an example distance sensor 100 that includes a two-dimensional imaging sensor and a three-dimensional imaging sensor, according to the present disclosure. Some components of the distance sensor 100 may be configured in a manner similar to the distance sensors described in U.S. patent application Ser. Nos. 14/920,246, 15/149,323, and 15/149,429.

For instance, as illustrated, the distance sensor 100 may include a light projecting system 102, a light receiving system 104, and a processor 106. The light projecting system 104 is configured to project a pattern 108 onto a surface or object 110, where the pattern 108 comprises a plurality of points of light. The points of light may be arranged in a grid, as shown in FIG. 1 (e.g., arranged in a plurality of rows and a plurality of columns). The rows and columns of the grid may be aligned in a collinear manner or may be staggered. The points of light may be invisible to the human eye, but visible to an imaging sensor of the distance sensor 100 (as discussed in further detail below).

Thus, the points of the three-dimensional pattern 108 may be arranged in a first coordinate system that is defined by a first axis 112 and a second axis 114 that is perpendicular to the first axis 112. The first coordinate system may comprise a three-dimensional "map" coordinate system of the distance sensor 100. The first coordinate system may include a datum point 116 defined where the first axis 112 and the second axis 114 intersect.

To this end, the light projecting system 102 may include one or more laser light sources that are capable of projecting beams of light in a wavelength that is substantially invisible to the human eye (e.g., an infrared wavelength). The light projecting system 104 may also include one or more diffractive optical elements for splitting the beams of light into additional beams of light. When each beam of light is incident upon a surface or object 110, a point of the pattern 108 is created on the surface or object 110.

The light receiving system 104 may include an imaging sensor 118 (also referred to herein more broadly as a "camera") for capturing images. The imaging sensor 118 may be a complementary metal-oxide-semiconductor (CMOS) sensor. The images may include a two-dimensional image of the surface or object 110, as well an image of the three-dimensional pattern 108 on the surface or object 110. Thus, in one example, where the light receiving system 104 includes a single imaging sensor to capture both the two-dimensional images and the images of the three-dimensional pattern 108, the light receiving system 104 may also include a bandpass filter. A bandpass filter may be needed in this case to remove ambient light when capturing two-dimensional images (which may be acquired using illumination by the same light source, e.g., infrared light source, which is used to generate the pattern 108).

In the example where the two-dimensional image of the surface or object 110 and the image of the three-dimensional pattern 108 are acquired by the same imaging sensor, an automatic correspondence between positions in the images may be obtained using the first coordinate system associated with the first axis 112, the second axis 114, and the datum point 116. For instance, a point 120 in the three-dimensional pattern 108 may have a position ($x_a$, $y_a$, $z_a$) in the first coordinate system including the datum point 116. However, in a second, two-dimensional coordinate system of the imaging sensor 118, the point 120 may have a position ($sx_a1$, $sy_a1$). A fixed positional relationship (indicated by arrow 122) between the first coordinate system and the second coordinate system may be defined as the relationship between the datum point 116 of the first coordinate system and a reference point 124 (e.g., a mechanical reference point) on the distance sensor 100.

The processor 106 may be configured to control the light projecting system 102 to project the three-dimensional pattern 108 and to illuminate the surface or object 110 for image capture. The processor 106 may also control the light receiving system 104 to capture the two-dimensional images of the surface or object 110 and the images of the three-dimensional pattern 108. The processor 106 may also perform operations to align the two-dimensional images of the surface or object 110 with the images of the three-dimensional pattern 108.

Figure 2:
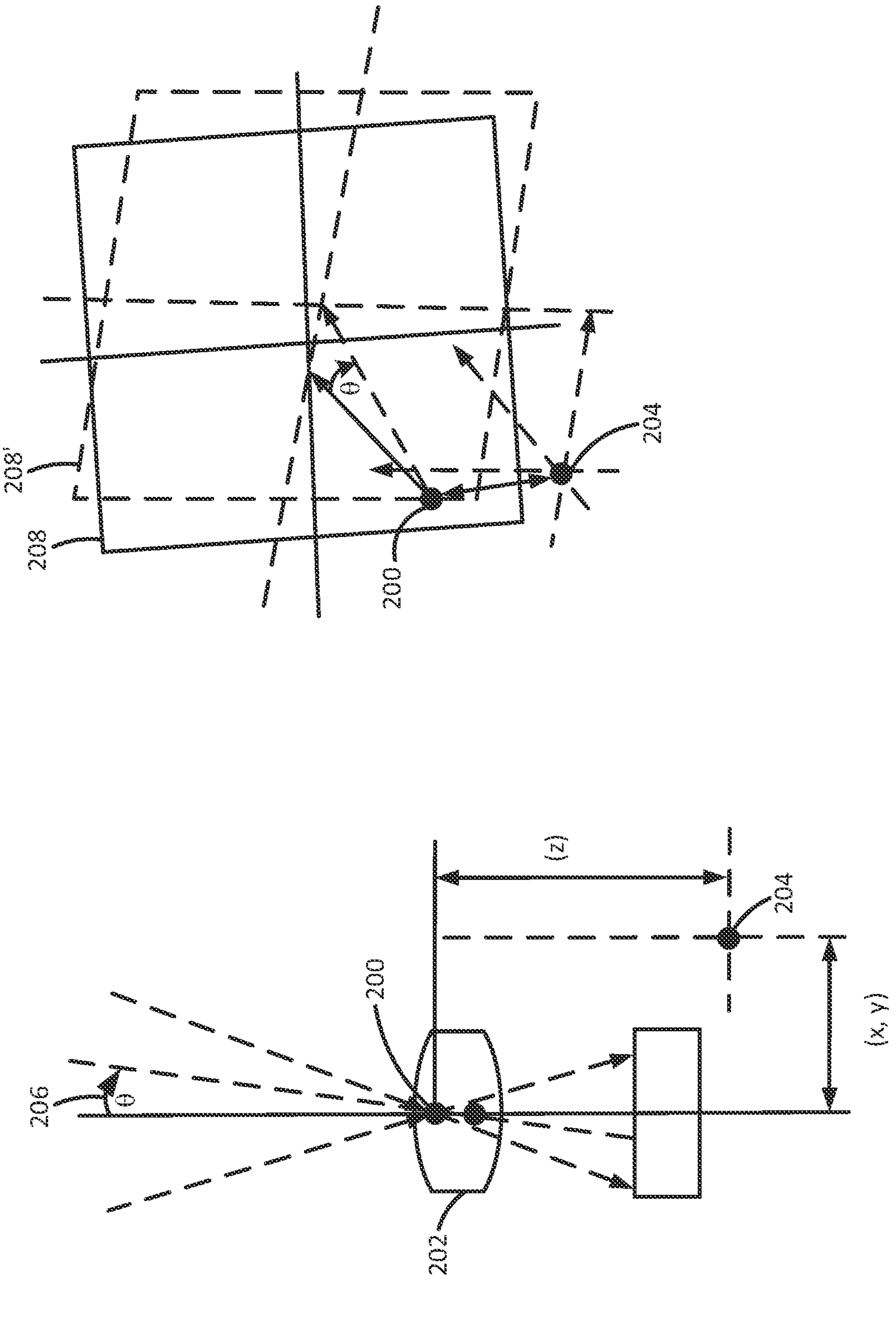
FIG. 2 illustrates the relationship between an example two-dimensional coordinate system and an example three-dimensional reference position in further detail.

FIG. 2 illustrates the relationship between an example two-dimensional coordinate system and an example three-dimensional reference position in further detail. As illustrated in FIG. 2, the datum point 200 of a two-dimensional image coordinate system may be fixed at the front nodal point of the lens 202 of a camera of the light receiving system. The two-dimensional image position of a mechanical reference point 204 may be measured relative to the datum point 200, as shown.

Also shown in FIG. 2 are the effects when the optical axis of the light receiving system is tilted by an angle θ, as illustrated by the arrow 206. The surface 208 corresponds to an optical axis that is oriented vertically (e.g., at a ninety-degree angle, while the surface 208' corresponds to an optical axis that is rotated by the angle θ.

The direction angles (e.g., tilt of the z axis and/or rotation of the field of view around the z axis) in the two-dimensional coordinate system may be known (e.g., by calibration or some other means) relative to the two-dimensional coordinate system.

Moreover, the mechanical positional relationship between the two-dimensional coordinate system and the housing of the two-dimensional camera is fixed at some value. Thus, the position of the external mounting mechanism which positions and fixes the housing to the distance sensor relative to the two-dimensional coordinate system is fixed. The direction angles relative to the two-dimensional coordinate system and the position of the housing relative to the two-dimensional coordinate system may be stored in a memory that is accessible by the processor of the distance sensor.

Figure 3:
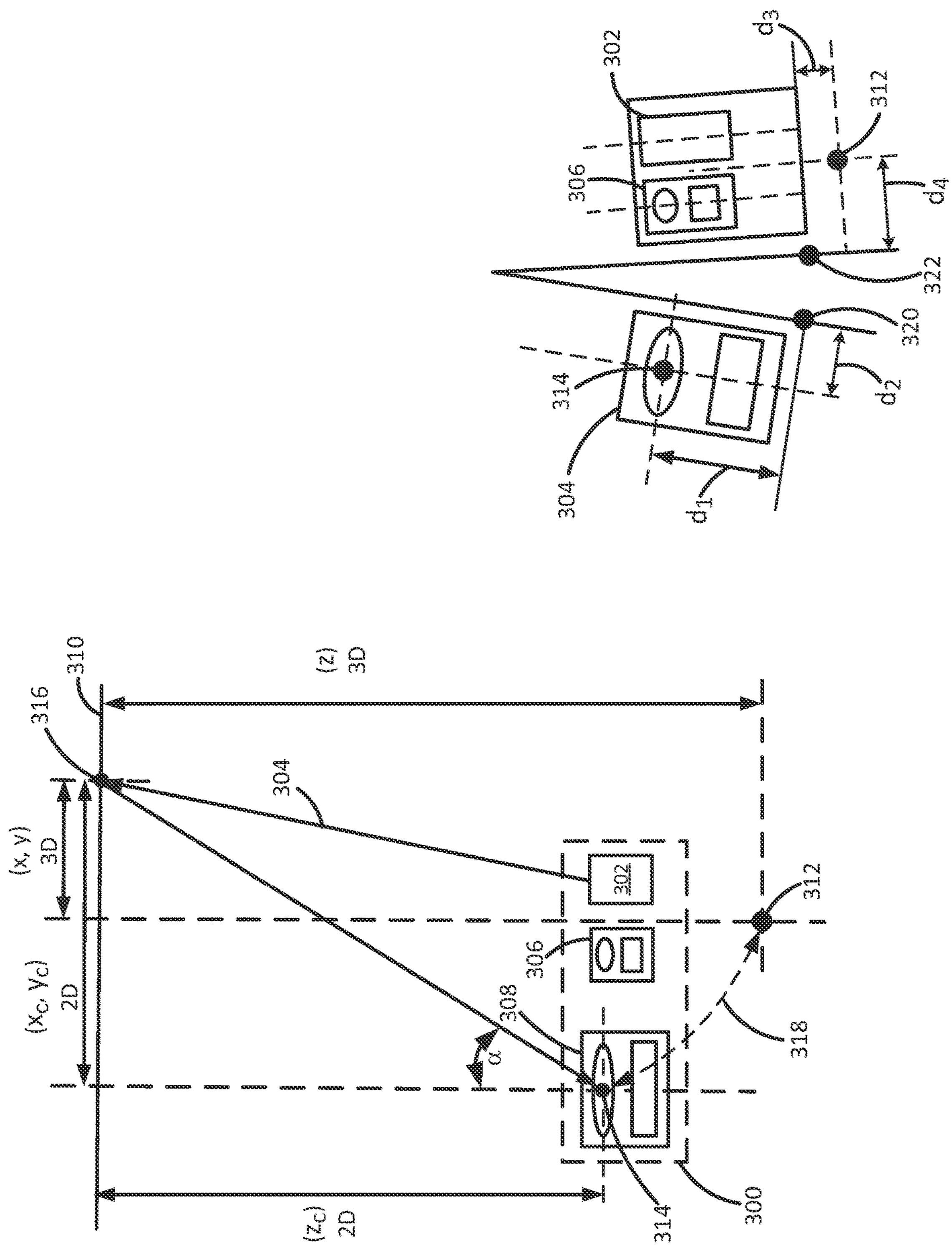
FIG. 3 illustrates the concept of transferring a three-dimensional coordinate system to the front nodal point of a two-dimensional camera.

FIG. 3 illustrates the concept of transferring a three-dimensional coordinate system to the front nodal point of a two-dimensional camera. The example 300 in FIG. 3 includes a light projecting system 302 for projecting a plurality of beams of light (including beam 304) and a light receiving system that includes a separate three dimensional camera 306 (for capturing images of the three-dimensional pattern projected by the light projecting system 302, which may be invisible to the human eye) and two-dimensional camera 308 (for capturing two-dimensional images of a surface 310 onto which the three-dimensional pattern is projected).

The coordinate system of the three-dimensional camera 306 includes a datum point 312, while the coordinate system of the two-dimensional camera 308 includes a datum point 314 (which is also the front nodal point of the lens of the two-dimensional camera 308).

The coordinate system of the three-dimensional camera 306 may be fixed with respect to the imaging sensor of the three-dimensional camera. The coordinate system of the three-dimensional camera 306 may be determined by a calibration process that stores a relationship between: (1) an object position with respect to the distance sensor 300 and (2) a point position in a three-dimensional image captured by the three-dimensional camera 306.

The coordinate system of the two-dimensional camera 308 may be defined as follows: The z axis may be defined as the line that passes through the center of the two-dimensional camera's imaging sensor and also passes through a corresponding point in a two-dimensional image captured by the two-dimensional camera 308. The x and y axes may be defined along the pixel array directions of the two-dimensional camera's imaging sensor.

(x, y) and (z) coordinates of a point 316 that is created on the surface 310 by the beam 304 are shown in the three-dimensional coordinate system, while corresponding ($x_c$, $y_c$)

and ($z_c$) coordinates of a point 316 that is created on the surface 310 by the beam 304 are shown in the two-dimensional coordinate system.

The position ($p_x$, $p_y$) of the point 316 on the imaging sensor of the two-dimensional camera 308 may, in one example, be calculated as:

$$(p_x,p_y)=\mathrm{Tan}^{-1}(x_c/z_c \text{ or } y_c/z_c)f_c \quad \text{(EQN. 1)}$$

where fc is the focal length (i.e., the distance between the lens and the imaging sensor) of the two-dimensional camera 308 and ($x_c$, $y_c$, $z_c$) is the position of the point 316 in the three-dimensional coordinate system associated with the three-dimensional camera 306 (with the origin transferred to the incident point 314 of the two-dimensional camera 308). Arrow 318 indicates a coordinate transfer between the three-dimensional coordinate system and the two-dimensional coordinate system.

Or, put another way:

$$p_x=(x_c/z_c)f_c \quad \text{(EQN. 2)}$$

and $$p_y=(y_c/z_c)f_c \quad \text{(EQN. 3)}$$

Thus, each three-dimensional image or "map" captured by the three-dimensional camera 306 may be treated as a point ($p_x$, $p_y$) on a two-dimensional image and a point having a depth $z_c$.

In one example, the transfer of the coordinate system reference position (e.g., from the datum point 312 of the three-dimensional coordinate system to the datum point 314 of the two-dimensional coordinate system) may be obtained according to the below translations:

$$\begin{Bmatrix} x' \\ y' \\ z' \end{Bmatrix} = \begin{Bmatrix} x+T_x \\ y+T_y \\ z+T_z \end{Bmatrix} \quad \text{(EQN. 4)}$$

where ($T_x$, $T_y$, $T_z$) is the amount of movement needed to translate the coordinate system reference position.

The rotational element of the coordinate system transfer may be defined as:

$$\begin{pmatrix} X \\ Y \\ Z \end{pmatrix} = \begin{pmatrix} \cos\gamma & \sin\gamma & 0 \\ -\sin\gamma & \cos\gamma & 0 \\ 0 & 0 & 1 \end{pmatrix} \begin{pmatrix} \cos\beta & 0 & -\sin\beta \\ 0 & 1 & 0 \\ \sin\beta & 0 & \cos\beta \end{pmatrix} \begin{pmatrix} 1 & 0 & 0 \\ 0 & \cos\alpha & \sin\alpha \\ 0 & -\sin\alpha & \cos\alpha \end{pmatrix} \begin{pmatrix} x \\ y \\ z \end{pmatrix} \quad \text{(EQN. 5)}$$

where (x, y, z) is the rotation of a around x to result in (x, y', z'); (x' y', z') is the rotation of β around y' to result in (x', y', Z); and (x', y' Z) is the rotation of y around Z to result in (X, Y, Z).

Also illustrated on the right-hand side of FIG. 3 are the mechanical reference points 322 and 324 of the two-dimensional camera 308 and the three-dimensional camera 306, respectively. The mechanical reference points 322 and 324 are fixed at positions that are known with respect to the two-dimensional coordinate system and the three-dimensional coordinate system, respectively. For instance, the distance $d_1$ (along the y axis in the two-dimensional coordinate system) between the between the datum point 314 and the reference point 320 and the distance $d_2$ (along the x axis in the two-dimensional coordinate system) between the datum point 314 and the reference point 320 are fixed. Similarly, the distance $d_3$ (along the y axis in the three-dimensional coordinate system) between the between the datum point 312 and the reference point 322 and the distance $d_4$ (along the x axis in the three-dimensional coordinate system) between the datum point 314 and the reference point 320 are fixed. By fixing the two-dimensional camera 304 and the three-dimensional camera 306 in a mechanically determined form, the positional relationship between a two-dimensional image captured by the two-dimensional camera 304 and a three-dimensional coordinate system of an image captured by the three-dimensional camera 306 can be determined, as discussed in greater detail with respect to FIG. 7. Put another way, if the two dimensional camera 308 has a mechanical reference point 320 at a determined position with respect to the datum point 314, then the positional relationship between the two-dimensional coordinate system and the three-dimensional coordinate system can be determined by the mechanical mountings of the three-dimensional camera 306 and the two-dimensional camera 308.

Since the optical axis of the two-dimensional camera 308 may vary due to the accuracy with which the lens is assembled, in one example, calibration of the two-dimensional camera 308 may be performed with respect to the mechanical reference point 320.

It should be noted that the position of the two-dimensional coordinate system relative to the reference point 320 may vary due to a change in the incident point of the lens of the two-dimensional camera 304 (e.g., due to focusing or zooming of the lens). In one example, the processor of the may be able to detect when the incident point is changed and may adjust the three-dimensional coordinate system to two-dimensional coordinates in a manner that takes the change of the incident point into account. For instance, the processor may calculate and store a value which reflects the change (e.g., magnification, distortion, or the like) in the specifications of the two-dimensional camera 304 due to the change in the incident point.

Moreover, as discussed above, the coordinate system of the three-dimensional camera 306 may be determined by a calibration process that stores a relationship between: (1) an object position with respect to the distance sensor 300 and (2) a point position in a three-dimensional image captured by the three-dimensional camera 306. Thus, in principle, a mechanical reference of the distance sensor 300 and the coordinate system of the three-dimensional camera 306 have correspondence. However, in order to take advantage of this correspondence, the mechanical criteria should match the positioning means when the three-dimensional camera 306 is mounted to the distance sensor 300.

In one example calibration process, the position of an object relative to a reference point $O_c$ (e.g., a coordinate system datum point, such as datum point 312) may be set to a known position (e.g., $z_1$, $z_2$, . . . , $z_n$). The position of a point a within the three-dimensional coordinate system may then be defined as ($x_a$, $y_a$, $z_a$), e.g., as shown in FIG. 1. The coordinates of a captured image of the point a on the imaging sensor of the two-dimensional camera may be defined as ($sx_a$1, $sy_a$1), as also shown in FIG. 1. Thus, if the position of an object is $z_2$, $z_n$, and if the coordinates of the captured image of the object on the imaging sensor of the two-dimensional camera are ($sx_a$2, $sy_a$2), ($sx_a$n, $sy_a$n), then the calibration process may map the relationships of $z_1$, $z_2$, . . . , $z_n$ and ($sx_a$1, $sy_a$1), ($sx_a$2, $sy_a$2), ($sx_a$n, $sy_a$n).

Figure 4:
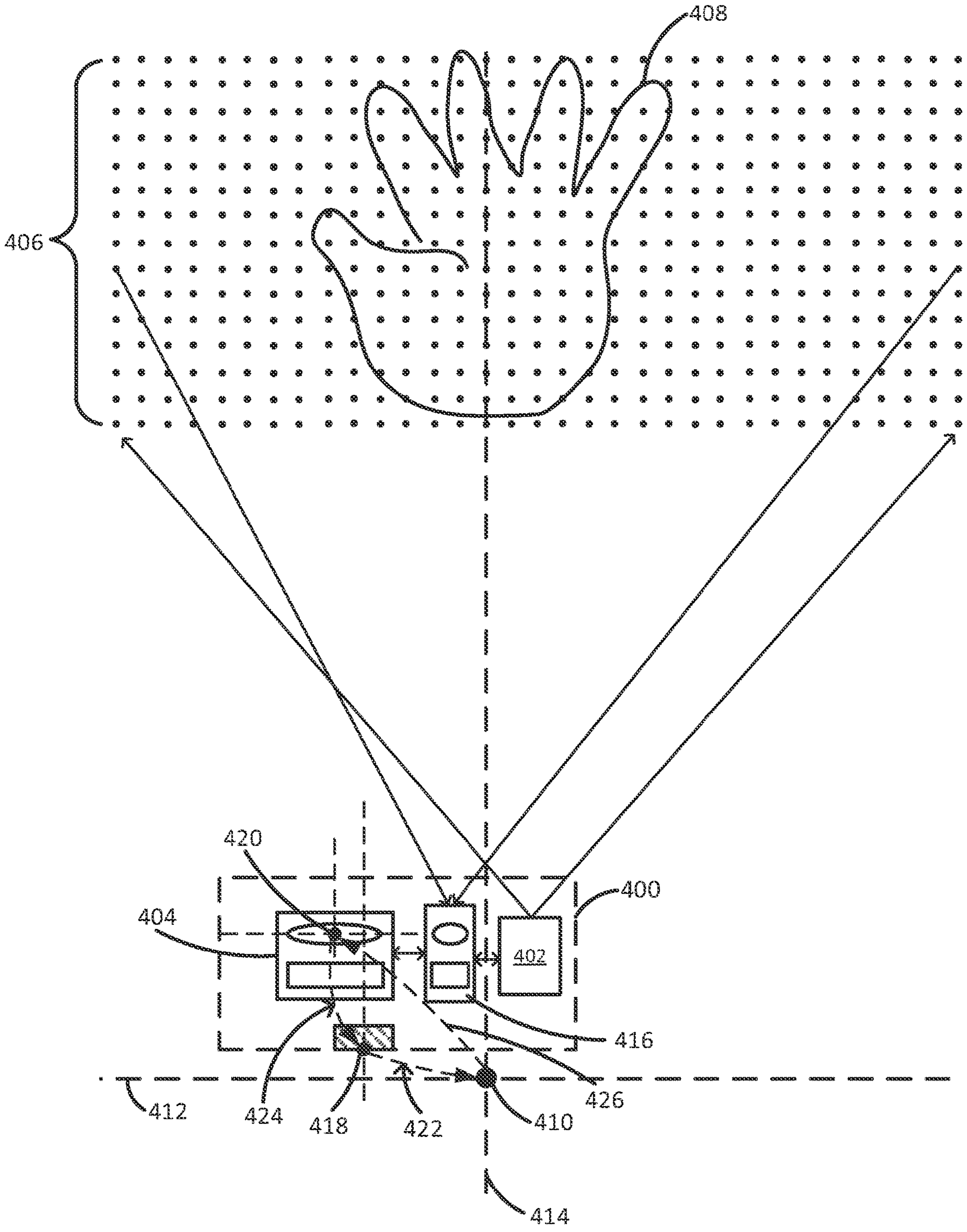
FIG. 4 illustrates the transfer of coordinate systems for a distance sensor whose light receiving system includes a three-dimensional camera that is integrated with a two-dimensional camera.

FIG. 4 illustrates the transfer of coordinate systems for a distance sensor 400 whose light receiving system includes a three-dimensional camera 416 that is integrated with a two-dimensional camera 404. In this case, the distance sensor 400 may comprise a light projecting system 402, the two-dimensional camera 404, and the three-dimensional camera 416. The distance sensor 400 may include additional components, such as a processor, a memory, and other components, which are omitted from illustration for the sake of simplicity. The light projecting system 402 is configured to project a three-dimensional pattern 406 onto a surface or object 408, where the pattern 406 comprises a plurality of points of light arranged in a grid as discussed above. The points of the three-dimensional pattern 406 may be arranged in a coordinate system that is defined by a first axis 412 and a second axis 414 that is perpendicular to the first axis 412. A datum point 410 may be defined where the first axis 412 and the second axis 414 intersect.

The light receiving system includes the two-dimensional camera 404 to capture the two-dimensional images and the three-dimensional camera 416 to capture the images of the three-dimensional pattern 406 The two-dimensional camera 404 and the three-dimensional camera 416 may be integrated (e.g., as a two dimensional camera that includes a three-dimensional imaging sensor). In this case, a positional relationship (indicated by arrow 422) between the three-dimensional coordinate system associated with the datum point 410 and a mechanical reference point 418 on the mechanical base of the light receiving system is known. A positional relationship (indicated by arrow 424) between the front nodal point 420 (which also serves as the datum point of a two-dimensional coordinate system) of the two-dimensional camera 404 and the mechanical reference point 418 is also known. Transfer from the three-dimensional coordinate system associated with the datum point 410 to the two-dimensional coordinate system associated with the datum point 420 is indicated by the arrow 426.

Figure 5:
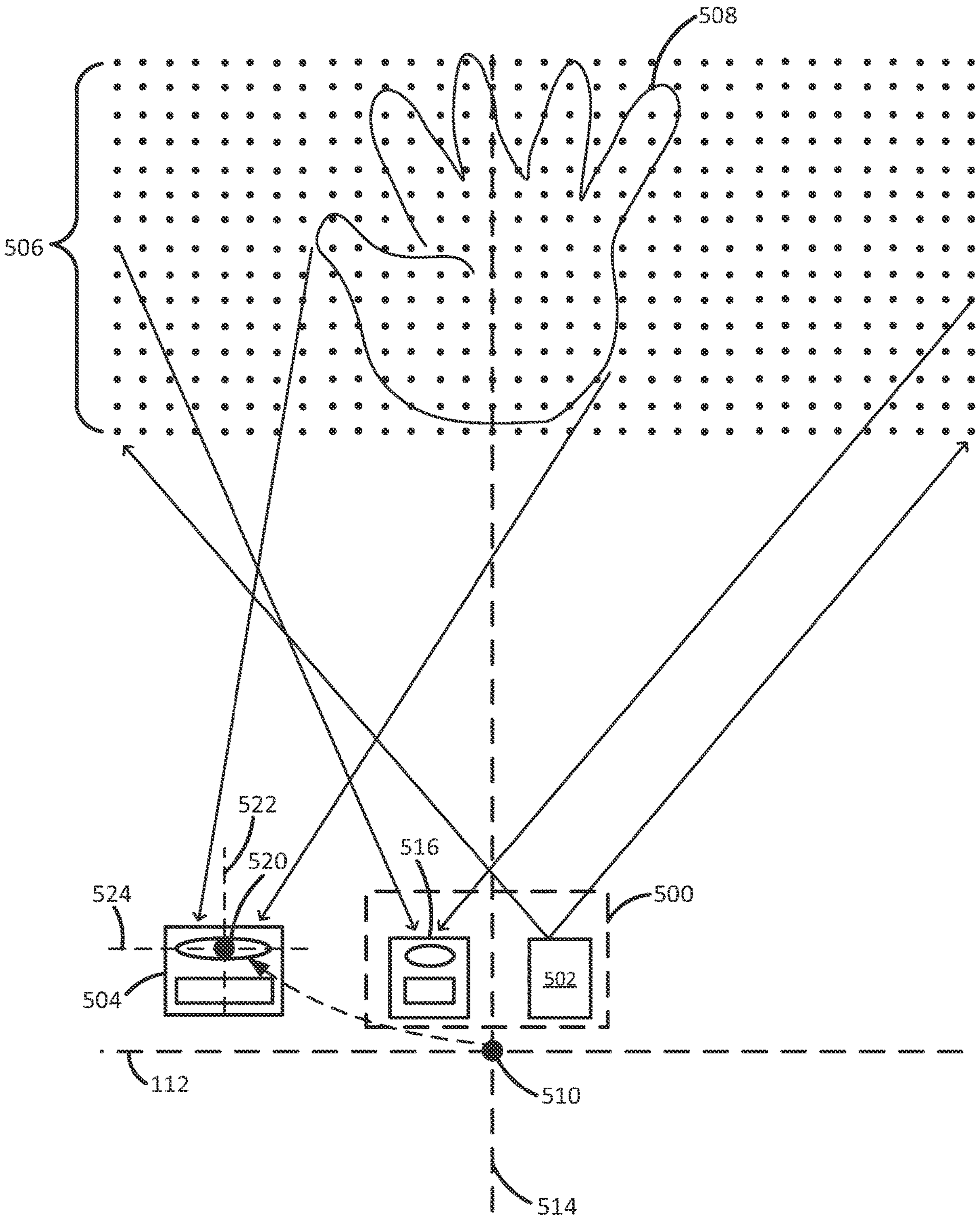
FIG. 5 illustrates the transfer of coordinate systems for a distance sensor whose light receiving system includes a separate (non-integrated) three-dimensional camera and two-dimensional camera.

FIG. 5 illustrates the transfer of coordinate systems for a distance sensor 500 whose light receiving system includes a separate (non-integrated) three-dimensional camera 516 and two-dimensional camera 504. The distance sensor 500 of FIG. 5 is similar to the distance sensor illustrated in FIG. 4, except that in FIG. 5, the three-dimensional camera 516 for capturing images of the three-dimensional pattern 506 (projected by light projecting system 502) is attached to the two-dimensional camera 504 for capturing two-dimensional images of the surface or object 508 post-assembly (i.e., the three-dimensional camera 516 and the two-dimensional camera 504 are not integrated). In this case, the three-dimensional coordinate system of the three-dimensional camera 516 (having the datum point 510 defined at the intersection of coordinate axes 512 and 514) has a fixed, known position relative to a mechanical reference point of the three-dimensional camera 516. The two-dimensional coordinate system of the two-dimensional camera 504 (having the datum point 520 defined at the intersection of coordinate axes 522 and 524) also has a fixed, known position relative to a mechanical reference point of the two-dimensional camera 504.

Thus, by mounting the three-dimensional camera 516 such that the mechanical reference point of the three-dimensional camera 516 has a known position relative to the mechanical reference point of the two-dimensional camera 504, the positional relationship between the three-dimensional coordinate system and the two-dimensional coordinate system can be known, and the coordinate systems can be matched by a conversion process. The same principle may apply where a plurality of three-dimensional cameras (having a plurality of respective mechanical reference points) are mounted relative to the two-dimensional camera 504.

Thus, there are many possible configurations that integrate the abilities of a two-dimensional camera to capture two-dimensional images and the abilities of a three-dimensional camera to capture three-dimensional images. For instance, a three-dimensional camera and a separate two dimensional camera may be integrated into a single device as discussed above. In another example, a separate three-dimensional imaging sensor may be mounted onto a two-dimensional camera, as also discussed above. In yet another example, a three-dimensional camera may be used to capture both the two-dimensional images and the three-dimensional images.

Three-dimensional cameras that work by detecting infrared illumination may include a bandpass filter to assist in detecting the infrared illumination. However, where a three-dimensional camera is used to capture two-dimensional images as well as three-dimensional images, the bandpass filter may be omitted. In this case, the three-dimensional camera may capture the two-dimensional images under relatively low-light conditions. However, since the two-dimensional image and the three-dimensional image are captured by different imaging sensors and different optical systems, it becomes necessary to correct a parallax between the two-dimensional coordinate system and the three-dimensional coordinate system.

Figure 6:
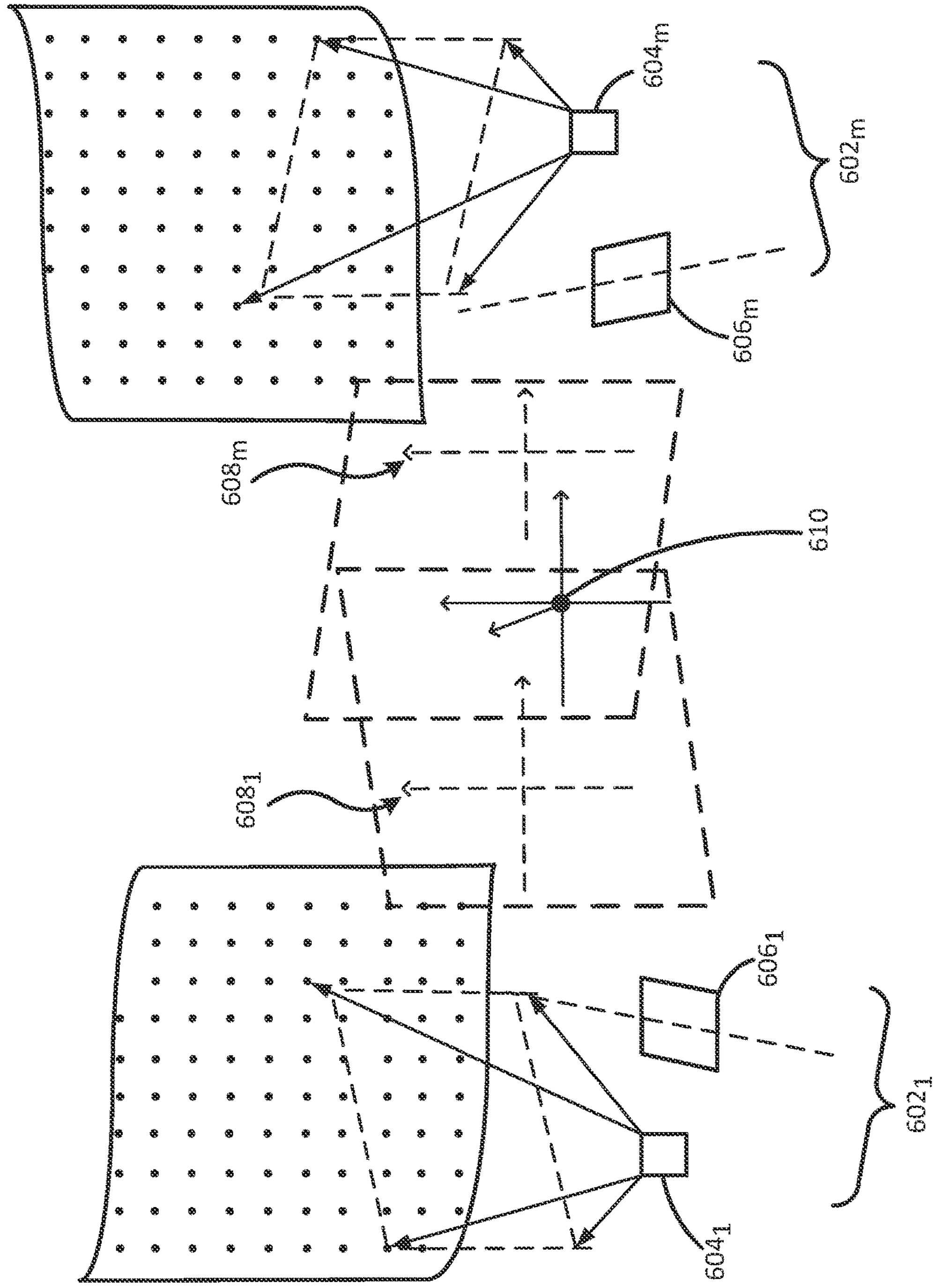
FIG. 6 illustrates an example system including a plurality of three-dimensional cameras.

FIG. 6 illustrates an example system 600 including a plurality of three-dimensional cameras $\mathbf{602}_1$-$\mathbf{602}_m$ (hereinafter individually referred to as a "camera 602" or collectively referred to as "cameras 602"). Each three-dimensional camera 602 includes a respective light projecting system $\mathbf{604}_1$-$\mathbf{604}_m$ (hereinafter individually referred to as a "light projecting system 604" or collectively referred to as a "light projecting system 604") for projecting a pattern of points of light and a respective imaging sensor $\mathbf{606}_1$-$\mathbf{606}_m$ (hereinafter individually referred to as an "imaging sensor 606" or collectively referred to as "imaging sensors 606") for capturing images of the projected pattern. By using a plurality of three-dimensional cameras, it may be possible to increase the range and improve the detection capabilities of a distance sensing system.

Each distance sensor 602 is associated with a respective three-dimensional coordinate system $\mathbf{608}_1$-$\mathbf{608}_m$ (hereinafter individually referred to as a "coordinate system 608" or collectively referred to as "coordinate systems 608"). However, an origin 610 define a master coordinate system to which the coordinate systems 608 are to be aligned.

If the mounting positions of the three-dimensional cameras 602 are known with respect to the origin 610 (which serves as a reference point for alignment purposes), then the positional relationships between the coordinate systems 608 can be automatically derived. Thus, the coordinate systems 608 may be matched with each other.

Figure 7:
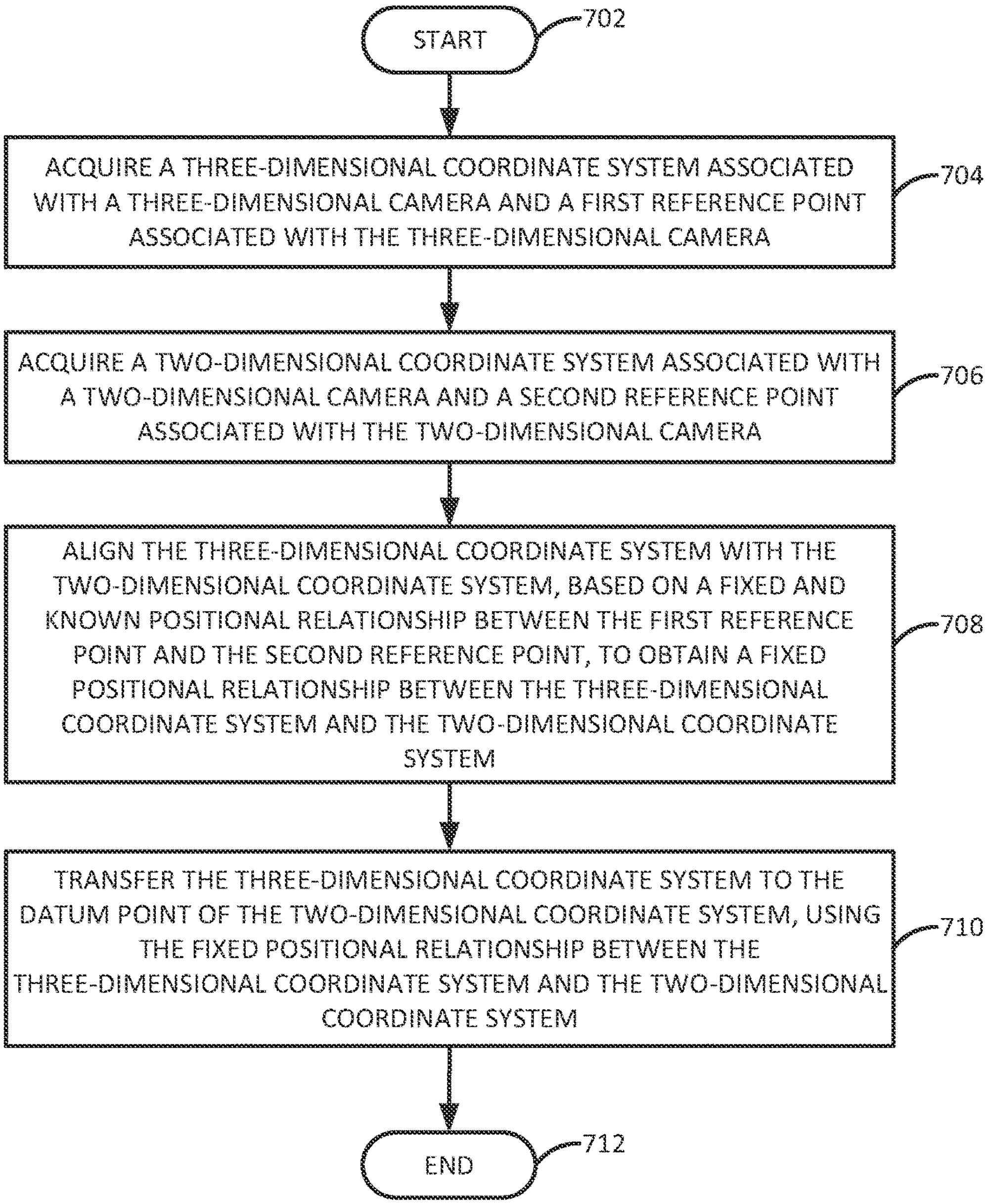
FIG. 7 is a flow chart illustrating an example method for transferring the coordinate system of a three-dimensional camera to the incident point of a two-dimensional camera.

FIG. 7 is a flow chart illustrating an example method 700 for transferring the coordinate system of a three-dimensional camera to the incident point of a two-dimensional camera. The method 700 may be performed, for example, by a processing system including at least one processor, such as the processing system of a distance sensor (e.g., processor 106 of FIG. 1). Alternatively, the method 700 may be performed by a processing system of a computing device such as the computing device 800 illustrated in FIG. 8 and described in further detail below. For the sake of example, the method 700 is described as being performed by a processing system.

The method 700 may begin in step 702. In step 704, the processing system of a distance sensor may acquire a three-dimensional coordinate system associated with a three-dimensional camera and a first reference point associated with the three-dimensional camera. The three-dimensional camera may be part of a distance sensor including a light projecting system for projecting a three-dimensional pattern onto an object and a processor for calculating a distance to the object based on an appearance of the three-dimensional pattern in an image captured by the three-dimensional camera. Thus, the three-dimensional coordinate system may comprise an (x, y, z) coordinate system.

As discussed above, the first reference point may have a fixed position relative to the datum point (or origin) of the three-dimensional coordinate system. In one example, the first reference point may comprise a mechanical reference point, e.g., on a housing of the three-dimensional camera, whose position relative to the datum point of the three-dimensional coordinate system is fixed and known through a calibration process. For instance, the mechanical reference point may comprise a mounting point of the three-dimensional camera. The position of the first reference point may be stored in a memory that is accessible to the processing system.

In step 706, the processing system may acquire a two-dimensional coordinate system associated with a two-dimensional camera (e.g., an RGB camera) and a second reference point associated with the two-dimensional camera. The two-dimensional camera may be part of the same distance sensor as the three-dimensional camera. The two-dimensional camera may capture two-dimensional images of the object onto which the three-dimensional pattern is projected (i.e., where the three-dimensional pattern is not visible in the two-dimensional images). Thus, the two-dimensional coordinate system may comprise an (x, y) coordinate system. In one example, the three-dimensional camera and the two-dimensional camera may be manufactured as a single integrated device (e.g., as illustrated in FIG. 4). In another example, the three-dimensional camera and the two dimensional camera may be manufactured separately and mounted to each other post-manufacture (e.g., as illustrated in FIG. 5).

As discussed above, the second reference point may have a fixed position relative to the datum point (or origin) of the two-dimensional coordinate system. In one example, the second reference point may comprise a front nodal point (or incident point) of a lens of the two-dimensional camera. In another example, the second reference point may comprise some other mechanical reference point on the two-dimensional camera (e.g., a mounting point) whose position relative to the origin of the two-dimensional coordinate system is fixed and known. The position of the second reference point may be stored in a memory that is accessible to the processing system.

In step 708, the processing system may align the three-dimensional coordinate system with the two-dimensional coordinate system, based on a fixed and known positional relationship between the first reference point and the second reference point, to obtain a fixed positional relationship between the three-dimensional coordinate system and the two-dimensional coordinate system. As discussed above, both the first reference point and the second reference point may have fixed positions relative to respective datum points of the three-dimensional coordinate system and the two-dimensional coordinate system. In addition, the first reference point and the second reference point may have some fixed positional relationship relative to each other. The fixed positional relationship may be stored in a memory that is accessible to the processing system.

Thus, based on knowledge of the fixed positional relationship between the first reference point and the second reference point and on knowledge of the fixed positional relationships between the first and second reference points and the datum points of the three-dimensional coordinate system and the two-dimensional coordinate system, respectively, the processing system may be able to align the respective datum points of the three-dimensional coordinate system and the two-dimensional coordinate system. Alignment of the respective datum points thus aligns the three-dimensional coordinate system and the two-dimensional coordinate system and allows the processing system to obtain a fixed positional relationship between the three-dimensional coordinate system and the two-dimensional coordinate system.

In step 710, the processing system may transfer the three-dimensional coordinate system to the datum point of the two-dimensional coordinate system, using the fixed positional relationship between the three-dimensional coordinate system and the two-dimensional coordinate system that was obtained in step 708. In one example, the transfer may involve computing the translational and rotation components of the amount of movement needed to convert a point in the three-dimensional coordinate system (e.g., having a position (x, y, z)) to a point on the imaging sensor of the two dimensional camera (e.g., having a position $(p_x, p_y)$) having depth (e.g., z). The point's new position in the three-dimensional coordinate system, as transferred, may be referred to as $(x_c, y_c, z_c)$. EQNs. 4-5 and FIG. 3, above, describe one example of a process of transferring the three-dimensional coordinate system to the datum point of the two-dimensional coordinate system.

The method 700 may end in step 712.

It should be noted that although not explicitly specified, some of the blocks, functions, or operations of the method 700 described above may include storing, displaying and/or outputting for a particular application. In other words, any data, records, fields, and/or intermediate results discussed in the method 700 can be stored, displayed, and/or outputted to another device depending on the particular application. Furthermore, blocks, functions, or operations in FIG. 7 that recite a determining operation, or involve a decision, do not imply that both branches of the determining operation are practiced. In other words, one of the branches of the determining operation may not be performed, depending on the results of the determining operation.

Figure 8:
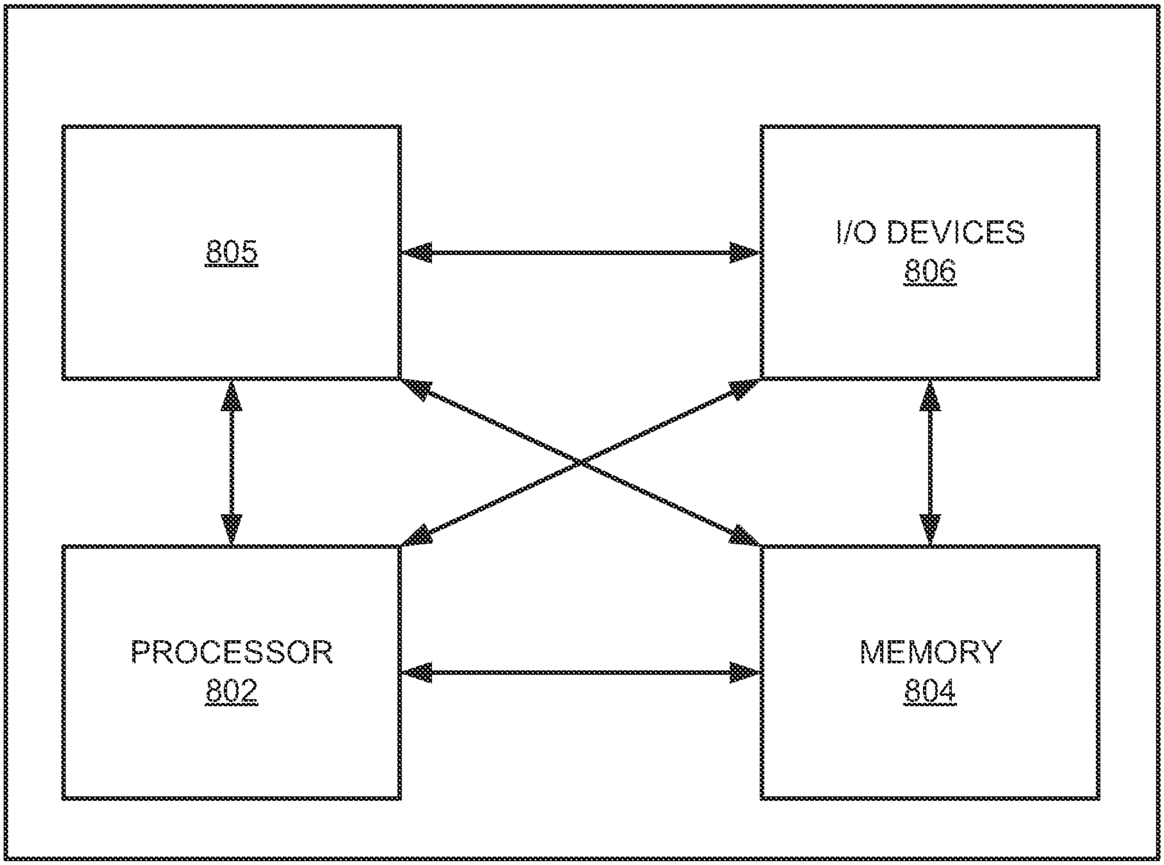
FIG. 8 depicts a high-level block diagram of an example electronic device for transferring the coordinate system of a three-dimensional camera to the incident point of a two-dimensional camera.

FIG. 8 depicts a high-level block diagram of an example electronic device 800 for transferring the coordinate system of a three-dimensional camera to the incident point of a two-dimensional camera. As such, the electronic device 800 may be implemented as a processor of an electronic device or system, such as a distance sensor (e.g., processor 106 of FIG. 1).

As depicted in FIG. 8, the electronic device 800 comprises a hardware processor element 802, e.g., a central processing unit (CPU), a microprocessor, or a multi-core processor, a memory 804, e.g., random access memory (RAM) and/or read only memory (ROM), a module 805 for transferring the coordinate system of a three-dimensional camera to the incident point of a two-dimensional camera, and various input/output devices 806, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the electronic device 800 may employ a plurality of processor elements. Furthermore, although one electronic device 800 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 800 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method (s).

In one example, instructions and data for the present module or process 805 for transferring the coordinate system of a three-dimensional camera to the incident point of a two-dimensional camera, e.g., machine readable instructions can be loaded into memory 804 and executed by hardware processor element 802 to implement the blocks, functions or operations as discussed above in connection with the method 700. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 805 transferring the coordinate system of a three-dimensional camera to the incident point of a two-dimensional camera of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

In one example, the present disclosure provides novel physical structures for a three-dimensional camera and a two-dimensional camera that are shaped to be connected in a manner that aligns the respective coordinate systems of the cameras as discussed above.

Figure 9A:
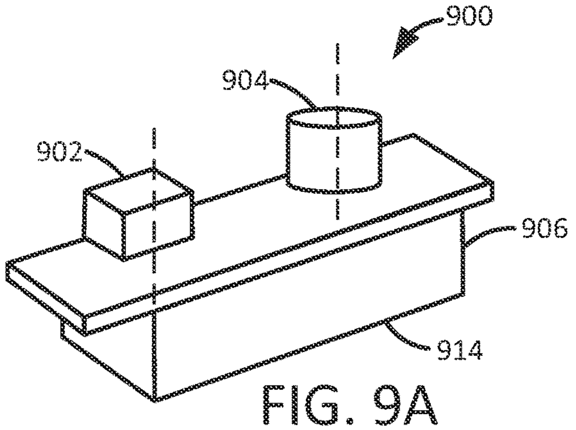
FIGS. 9A-9C illustrate various views of a three-dimensional camera according to aspects of the present disclosure.
Figure 9C:
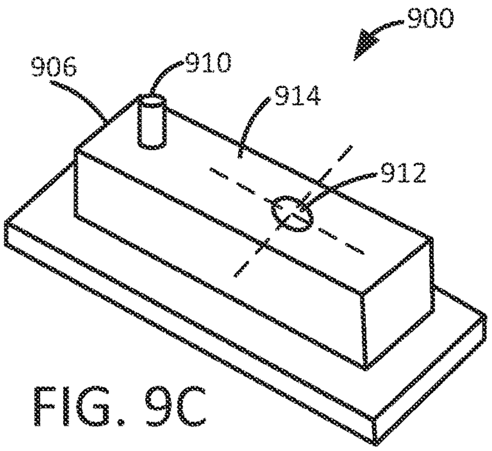
Figure 9B:
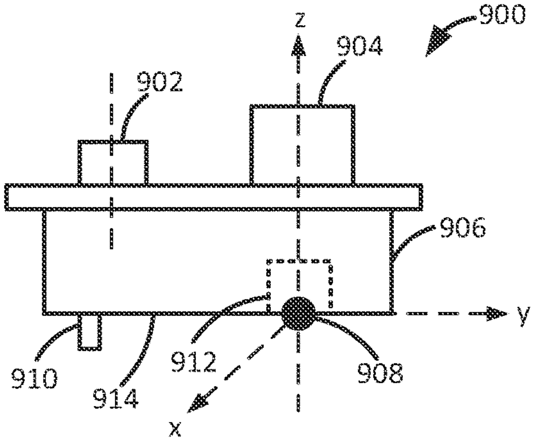

FIGS. 9A-9C illustrate various views of a three-dimensional camera 900 according to aspects of the present disclosure. In particular, FIG. 9A illustrates an isometric view of the top of the three-dimensional camera 900, FIG. 9B illustrates a side view of the three-dimensional camera 900, and FIG. 9C illustrates an isometric view of the bottom of the three-dimensional camera 900.

As illustrated, the three-dimensional camera 900 generally comprises a light projecting system including optics 902 for projecting a plurality of beams of light and a light receiving system including a camera lens 904 for capturing an image of the pattern formed by the plurality of beams of light. Both the light projecting system and the light receiving system are contained within a common housing 906.

As shown in FIG. 9B, a datum point 908 of the three-dimensional camera is defined on an exterior of the housing 906, at the base of the light receiving system. The datum point 908 represents the origin of a three-dimensional (e.g., (x, y, z)) coordinate system.

Figure 10:
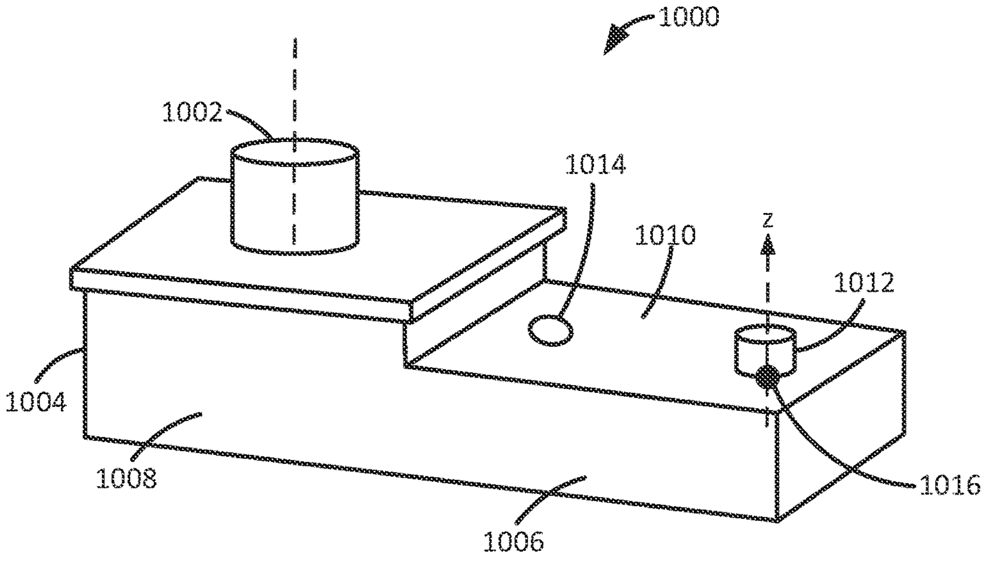
FIG. 10 illustrates an isometric view of a top of a two-dimensional camera having a structure that is designed to be connected to the three-dimensional camera of FIGS. 9A-9C.

As shown in FIG. 9C, the bottom exterior surface (or plane) 914 of the housing 906 further includes a positioning system to facilitate connection to an appropriately configured two-dimensional camera (discussed in further detail with respect to FIG. 10). In one example, the positioning system includes a pin 910 and a bore 912. The pin 910 extends outward from the bottom exterior surface 914 of the housing 906. The bore 912 defines an opening in the bottom exterior surface 914 of the housing 906.

The positioning system of the three-dimensional camera 900 may serve as a reference point for calibration of the three-dimensional camera 900. In particular, the datum point 908 may be aligned with the bore 912 as shown in FIG. 9B.

FIG. 10 illustrates an isometric view of a top of a two-dimensional camera 1000 having a structure that is designed to be connected to the three-dimensional camera 900 of FIGS. 9A-9C. As illustrated, the two-dimensional camera 1000 comprises a light receiving system including a camera lens 1002 for capturing an image of an object. The light receiving system is contained within a housing 1004.

The housing 1004 includes a base portion 1006 and an elevated portion 1008 that is raised with respect to the base portion. The elevated portion 1008 contains the circuitry and optics for the camera including the lens 1002. The base portion 1006 includes a planar surface 1010 which includes a positioning system to facilitate connection to an appropriately configured three-dimensional camera (such as the three-dimensional camera 900 of FIG. 9). In one example, the positioning system includes a pin 1012 and a bore 1014. The pin 1012 extends outward from the planar surface 1010 of base portion 1006. The bore 1014 defines an opening in the planar surface 1010 of base portion 1006.

A datum point 1016 of the two-dimensional camera 1000 is defined at a base of the pin 1012. Thus, the positioning system of the two-dimensional camera 1000 may be measured against the optics specifications of the two-dimensional camera.

As discussed above, the structures of the three-dimensional camera 900 and the two-dimensional camera 1000 allow the three-dimensional camera 900 and the two-dimensional camera 1000 to be connected to form a single device. Specifically, the three-dimensional camera 900 may be lined up with the two-dimensional camera 900 so the respective positioning systems engage each other, i.e., so that the pin 910 of the three-dimensional camera's housing 906 is inserted into the bore 1014 in the two-dimensional camera's housing 1004, and the pin 1012 of the two-dimensional camera's housing 1004 is inserted into the bore 912 in the three-dimensional camera's housing 906.

Thus, the positioning system of the three-dimensional camera 900 (including the pin 910 and the bore 912) mechanically positions the datum point 908 of the three-dimensional coordinate system. The three-dimensional measurement data will follow the three-dimensional coordinate system defined by this positioning geometry. Similarly, the positioning system of the two-dimensional camera 1000 (including the pin 1012 and the bore 1014) is fixed to a known (or easily measured) positional relationship with respect to the two-dimensional camera's optical system (including the lens 1002). The arrangement of the connected three-dimensional camera 900 and two-dimensional camera 1000 allows the three-dimensional coordinate system to an arbitrary position.

In a conventional two-dimensional camera, captured images may vary with respect to a mechanical position of the two-dimensional camera (due to various factors including variations in the positional relationships of the lens, imaging sensor, and other components, lens aberrations, and the like). However, the structure provided by connecting the three-dimensional camera 900 and the two-dimensional camera 1000 in the manner discussed above can compensate for camera lens variations by adopting a conventional method for measuring lens variations of the two-dimensional camera 1000.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A distance sensor, comprising:
- a light projecting system including optics to project a plurality of beams of light in a wavelength that is invisible to a human eye;
- a light receiving system including a three-dimensional camera to capture an image of a pattern formed by the plurality of beams of light;
- a first housing to contain the light projecting system and the light receiving system; and
- a first positioning system formed on an exterior surface of the first housing to facilitate a connection to a second positioning system on a second housing that houses a two-dimensional camera, wherein the two-dimensional camera is connected to the distance sensor via the second positioning system, wherein the second housing comprises:
- a base portion including a planar surface; and
- an elevated portion that is coupled to and raised with respect to the base portion.

2. The distance sensor of claim 1, wherein a datum point of the three-dimensional camera is defined on the exterior surface of the first housing, at a base of the light receiving system.

3. The distance sensor of claim 2, wherein the datum point represents an origin of a three-dimensional coordinate system.

4. The distance sensor of claim 1, wherein the first positioning system comprises:
- a pin extending outward from the exterior surface; and a bore defining an opening in the exterior surface.

5. The distance sensor of claim 4, wherein the bore is aligned with a datum point of the three-dimensional camera.

6. The distance sensor of claim 1, wherein the second positioning system is formed on the base portion.

7. The distance sensor of claim 6, wherein the second positioning system comprises:
- a pin extending outward from the planar surface; and a bore defining an opening in the planar surface.

8. The distance sensor of claim 7, wherein the bore is aligned with a datum point of the two-dimensional camera.

9. The distance sensor of claim 8, wherein circuitry and optics of the two-dimensional are housed within the elevated portion.

10. A camera apparatus, comprising:
- a housing, the housing comprising:
  - a base portion including a planar surface;
  - an elevated portion that is coupled to and raised with respect to the base portion;
  - a two-dimensional camera, wherein optics and circuitry for the two-dimensional camera are housed within the elevated portion; and
  - a positioning system formed on the planar surface, wherein the housing is connected to another positioning system on another housing that houses a distance sensor including a three-dimensional camera.

11. The apparatus of claim 10, wherein the positioning system comprises:
- a pin extending outward from the planar surface; and
- a bore defining an opening in the planar surface.

12. The apparatus of claim 11, wherein the bore is aligned with a datum point of the two-dimensional camera.

13. An apparatus, comprising:
- a distance sensor, comprising:
  - a light projecting system including optics to project a plurality of beams of light in a wavelength that is invisible to a human eye;
  - a light receiving system including a three-dimensional camera to capture an image of a pattern formed by the plurality of beams of light;
  - a first housing to contain the light projecting system and the light receiving system; and
  - a first positioning system formed on an exterior surface of the first housing; and
  - a two dimensional camera, comprising:
    - a second housing comprising a base portion and an elevated portion that is raised with respect to the base portion;
    - optics and circuitry for the two-dimensional camera, housed within the elevated portion of the second housing; and
    - a second positioning system formed in a planar surface of the base portion,
  - wherein the first positioning system engages the second positioning system in a manner that mechanically fixes a positional relationship between a coordinate system of the three-dimensional camera and a coordinate system of the two-dimensional camera.

14. The apparatus of claim 13, wherein the first positioning system comprises:
- a first pin extending outward from the exterior surface; and
- a first bore defining an opening in the exterior surface.

15. The apparatus of claim 14, wherein the second positioning system comprises:
- a second pin extending outward from the planar surface; and a second bore defining an opening in the planar surface.

16. The apparatus of claim 15, wherein the first positioning system engages the second positioning system when the first pin is inserted in the second bore, and the second pin is inserted in the first bore.

17. The apparatus of claim 16, wherein the first bore is aligned with a datum point of the three-dimensional camera, and wherein the second bore is aligned with a datum point of the two-dimensional camera.

18. The apparatus of claim 17, wherein the datum point of the three-dimensional camera represents an origin of a three-dimensional coordinate system.

* * * * *